United States Patent [19]

Collas et al.

[11] Patent Number: 5,473,347
[45] Date of Patent: Dec. 5, 1995

[54] INTEGRATED POINTING AND SIGNALING DEVICE

[75] Inventors: James P. Collas, N. Sioux City, S. Dak.; Michael R. Flannery, Sioux City, Iowa

[73] Assignee: Gateway 2000, North Sioux City, S. Dak.

[21] Appl. No.: 388,186

[22] Filed: Feb. 13, 1995

Related U.S. Application Data

[63] Continuation of Ser. No. 210,124, Mar. 16, 1994, abandoned.

[51] Int. Cl.⁶ .................................................. G09G 3/02
[52] U.S. Cl. .................................... 345/169; 345/168
[58] Field of Search ............................ 345/168, 167, 345/161, 157, 156, 160, 169; D14/115

[56] References Cited

U.S. PATENT DOCUMENTS

| | | |
|---|---|---|
| D. 285,201 | 8/1986 | Kim . |
| D. 291,574 | 8/1987 | Kim . |
| D. 340,445 | 10/1993 | Marquardt et al. ............ D14/115 |
| 4,633,167 | 12/1986 | Kitts ................................ 345/161 |
| 4,949,080 | 8/1990 | Milkan . |
| 5,021,771 | 6/1991 | Lachman . |
| 5,034,574 | 7/1991 | Martovitz ....................... 345/168 |
| 5,049,863 | 9/1991 | Oka . |
| 5,122,786 | 6/1992 | Rader . |
| 5,144,302 | 9/1992 | Carter et al. . |
| 5,156,475 | 10/1992 | Zilberman . |
| 5,160,919 | 11/1992 | Mohler et al. ................. 345/168 |
| 5,208,736 | 5/1993 | Crooks et al. ................. 345/167 |

OTHER PUBLICATIONS

User's Guide Gateway 2000 Handbook 486, Part #MAN1263100 Rev. 1.0 Oct. 1993, pp. 1–11.
IBM ThinkPad 720C Quick Reference, Copyright IBM Corp. 1993, pp. 1–6, 1–7, 2–30 and 2–31.
"What's New", Popular Science, Sep. 1990.

*Primary Examiner*—Curtis Kuntz
*Assistant Examiner*—Vivian W. Chang
*Attorney, Agent, or Firm*—Lee, Mann, Smith, McWilliams, Sweeney & Ohlson

[57] ABSTRACT

A computer pointing device is disclosed for controlling the positioning, movement and operation of a cursor on the display screen of a computer. A manually manipulatable member in the form of a stubby button-like joystick is permanently and ergonomically located within the area defined by the rows of computer keyboard keys and is immediately adjacent the last key in one row of keys, so that the computer operator can move or apply a force to the member to position the cursor in a manner which is very comfortable and similar to the movement from home position that is required when using a mouse as a pointing device. Operational click or "mouse" buttons are located on the front face of the computer case in position for pressing by the right thumb of the computer operator with a normal thumb contraction motion, which is natural and comfortable as opposed to pressing sideways with the side of the thumb.

5 Claims, 2 Drawing Sheets

INTEGRATED POINTING AND SIGNALING DEVICE

This application is a continuation of application Ser. No. 08/210,124, filed Mar. 16, 1994, now abandoned.

This invention relates to a computer pointing and signaling device for controlling the positioning, movement and operation of a cursor on the display screen of a computer and for signaling the choice of computer command identified by the position of the cursor on the display screen menu. More particularly, the pointing device is permanently, positionally and ergonomically integrated into the computer keyboard so that the computer operator can easily and effortlessly manipulate the pointing device and depress the operating command signaling click or "mouse" buttons to position and operate the cursor in a manner which is very comfortable and similar to the movement from home position that is required when using a mouse as a pointing device. The pointing device is particularly useful in connection with small, compact, portable computers.

BACKGROUND OF THE INVENTION

Various devices are well known for controlling cursor movement over a computer display screen of a computer and for signaling a choice of computer command identified by the position of the cursor on the display screen menu. One such device is a "mouse" which has a ball on its underside that is rolled over a horizontal surface, with the x- and y-axis components of movement being sensed and transmitted through a connecting cable to a serial input port of the computer. The signal to the computer is varied in accordance with the amount and direction of movement of the mouse ball, and causes the cursor on the display screen to have a corresponding movement. Two "mouse" or "click" buttons located on the top of the mouse at the forward end permit the computer operator to input a selection or other command to the computer (the command typically being indicated by the position of the cursor on a displayed menu) upon pressing one or the other or both buttons, depending upon the software associated with the device. Such a device, which is separate from the computer console and keyboard and requires a connection to a computer port, requires a flat, horizontal surface, and for operation of the mouse, the computer operator must completely remove one hand from the computer keyboard.

Another cursor controlling and signalling mechanism is a "joystick" which like the mouse is completely separated from the computer console and keyboard. The joystick is typically an elongated stick which extends upwardly from a base that is connected to the computer console by means of a cable. The joystick is operated by tilting the upstanding stick in various directions to cause the cursor or other display element to move in a direction and usually at a speed corresponding to the direction and pressure exerted on the stick by the computer operator. The operation of a joystick, however, frequently requires that both hands be removed from the computer keyboard, one hand to hold the base while the other manipulates the joystick. A "click" button is usually located on the joystick itself. Although a mouse or a joystick can be used with a portable "laptop" or "notebook" size computers, such devices are cumbersome, must be carried separately and connected to the computer prior to use, and are not suitable for operation during travel.

Another type of cursor controlling device is a "trackball". This device, which in essence is an inverted mouse, includes a rotatable ball mounted within a housing. The ball is rotated by a finger, thumb or palm of the computer operator, and the x- and y-components of movement are sensed and input into the computer to cause corresponding movement of the cursor across the display screen. "Mouse or "click" buttons are usually located on the trackball housing, although with some models the selection signal is input by pressing the "enter" key on the standard keyboard. This type of pointing device has been found useful in conjunction with portable computers because it can be temporarily affixed to one side of the computer case for manipulation by one hand of the computer operator. However, even though trackball devices can be removably attached to the computer case, they still require attachment prior to use and removal after use and they do not have an ergonomically positioned set of "click" buttons.

One manufacturer of portable laptop computers, recognizing the need for placing the cursor controlling device in a permanent and more convenient location, installed a small, stubby, buttonlike joystick centrally among the keys of the computer keyboard, specifically at the juncture of the "g", "h" and "b" keys of the standard "QWERTY" keyboard. The joystick was sensitive to lateral pressure, the magnitude and direction of which were sensed and input into the computer to cause movement of the cursor, and the speed and direction of cursor movement corresponded to the magnitude and direction of pressure on the joystick. That manufacturer also provided two upwardly extending "mouse" or "click" buttons immediately below the space bar. The problem with that arrangement was that the stubby joystick was in the middle of the keyboard keys where it would be constantly hit by the fingers during normal keyboard operation, and requiring users to rotate their hand to an uncomfortable and unnatural position to use the joystick. Moreover, the "click" buttons were positioned so that it was awkward to operate them accurately using the side of the thumb rather the end of the thumb or a finger and yet they could be accidentally hit and actuated by the operator when operating the space bar or while the hands are at rest. That arrangement was not comfortable for the user who could be and many times would be required to operate the pointing device for extended periods of time without using the keyboard. Additionally, in a compact computer, room on the keyboard top is at a premium.

SUMMARY OF THE INVENTION

The pointing device constructed in accordance with the present invention eliminates the deficiencies of the prior art. All elements of the pointing device are permanently, ergonomically and unobtrusively integrated into the computer keyboard so that the computer operator can operate the device for even extended periods of time in a manner which is very comfortable and similar to the movement from home position that is required when using a mouse as a pointing device.

The present invention is used in combination with a computer having a display screen and a keyboard having a front wall, a rear wall, a pair of oppositely disposed side walls, and a top having an opening, typically of generally rectangular configuration. The keyboard keys, which are arranged in rows, extend upwardly through the top opening of the keyboard casing. A pointing device is provided having a manually manipulatable (preferably manually movable) member which is located within the computer keyboard top opening immediately adjacent the last key in one of the rows of keys and between that key and one of the side walls of the keyboard. The manually manipulatable is preferably surrounded on three sides, i.e., front, rear, and left side, by the keys of the keyboard.

Preferably the pointing device manually manipulatable member is a laterally movable or tiltable button-like joystick, the upper end of which is approximately level with the top of the keyboard keys and is forcibly moveable laterally, with the direction and magnitude of movement or pressure on the joystick being indicative of the desired direction and magnitude of movement of the cursor across the computer display screen. It is preferred that the joystick be laterally tiltable, although in accordance with the broadest aspects of the invention the upper end of the joystick need only be laterally pressed sufficient to permit a pressure sensing device to indicate the direction and magnitude of pressure applied. It is not necessary that the joystick move perceptibly. As used herein the term "manipulatable" is intended to encompass both the movable and immovable (but pressure sensitive) joystick systems.

At least one and preferably two depressible click buttons are provided. These click buttons extend through the front wall of the computer keyboard so that they may be easily and ergonomically depressed by the computer operator's thumb in a normal and comfortable contraction motion. The click buttons are in such close proximity to the joystick that both the joystick and the click buttons may be operated by the computer operator without stretching.

DESCRIPTION OF THE PREFERRED EMBODIMENT

Figure 1:
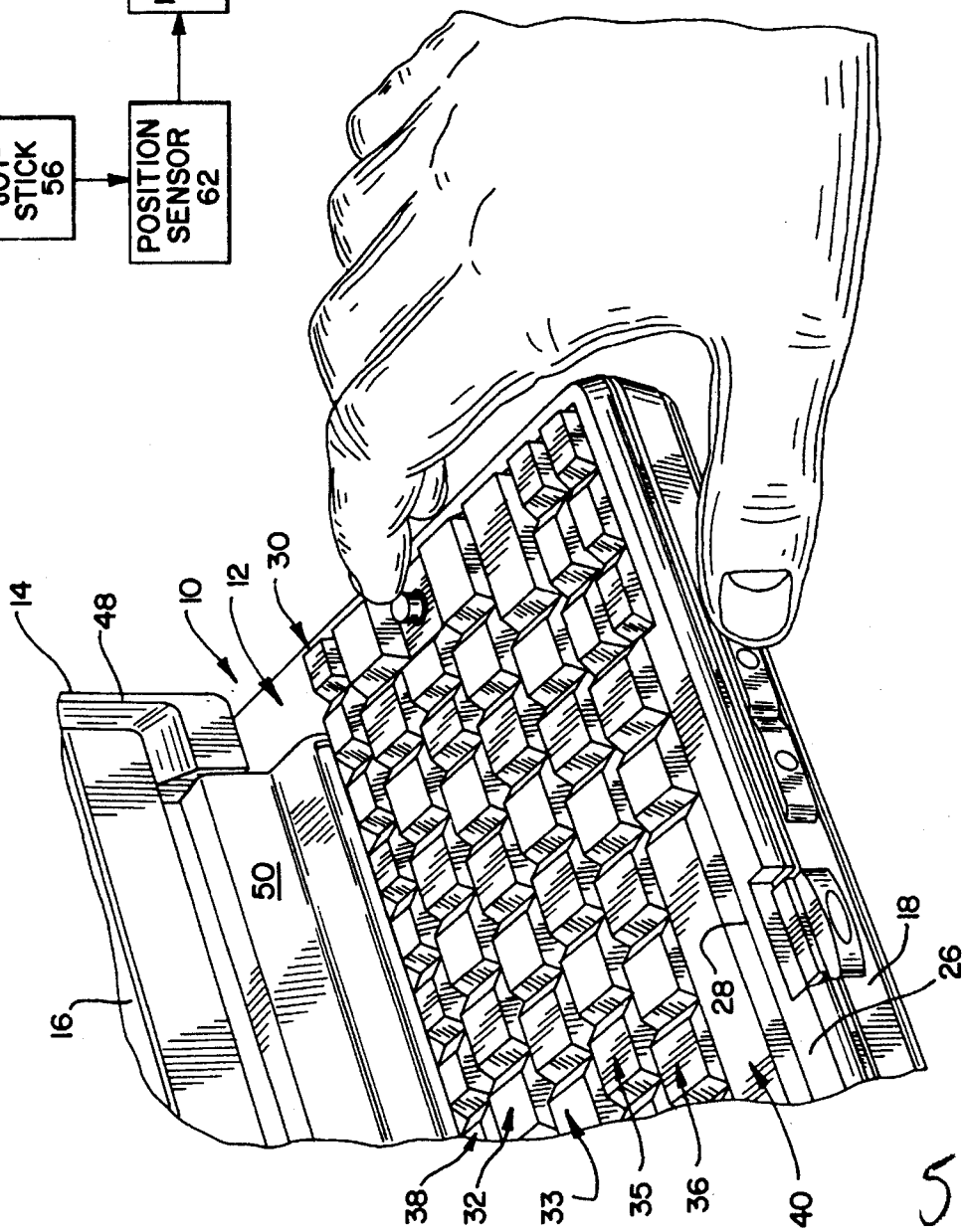
FIG. 1 is a perspective view of a portion of a laptop computer incorporating the pointing device of the present invention, illustrating the manner in which the cursor-positioning joystick is permanently and ergonomically incorporated into the computer keyboard and showing the location of the click buttons on the front side wall of the keyboard.
Figure 2:
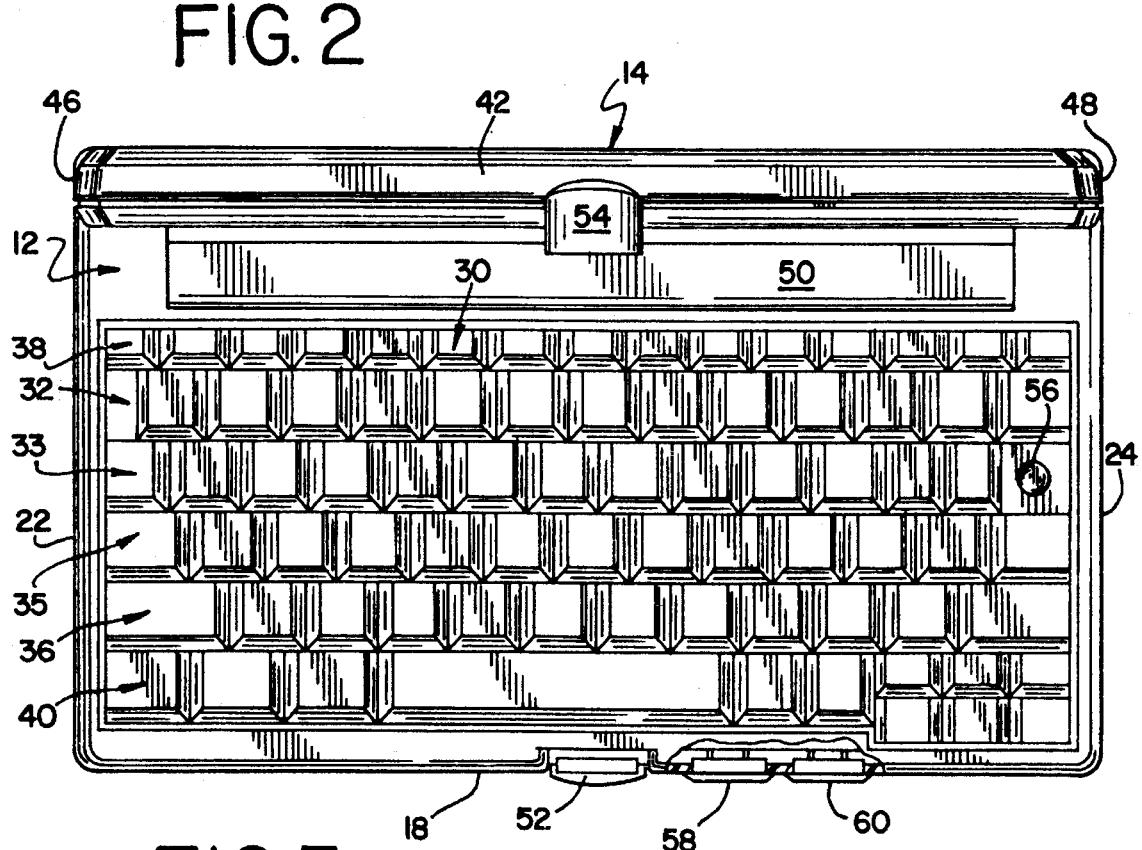
FIG. 2 is a top plan view of the computer with the display screen cover in a vertical position and showing the keyboard, the cursor-positioning joystick and the click buttons.
Figure 3:
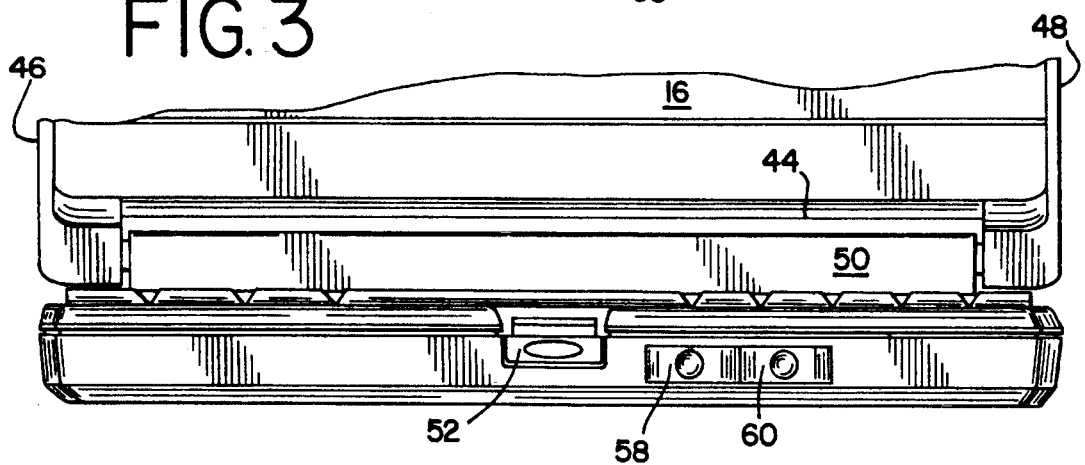
FIG. 3 is a front elevation of the computer of FIG. 2, showing only a portion of the display screen cover.
Figure 4:
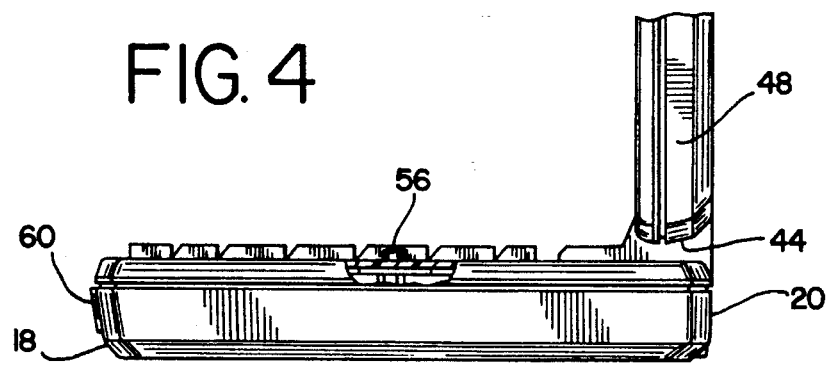
FIG. 4 is a side elevational view of the computer of FIG. 3.

In FIG. 1 there is illustrated a portable computer 10 of the type commonly known as a laptop or notebook computer. This type of computer is very compact and is contained in a two-piece case, the bottom portion of which is a keyboard 12 and the top portion of which is a cover 14 which houses a display screen 16.

The keyboard 12 has an integrally molded front wall 18, rear wall 20, oppositely disposed side walls 22 and 24, and top 26. The top 26 has an opening 28, which in the illustrated embodiment is rectangular, and a plurality of depressible keys 30 extend upwardly through the keyboard opening 28. The keys are arranged in a standard "QWERTY" arrangement in four alphanumeric middle rows 32, 33, 35 and 36, a back "function" row 38, and a front control row 40 in which are found the space bar and such operational keys as the "control", "alternate", "page-up", "page-down" and cursor moving keys.

The computer cover 14 also has an integrally molded front wall 42, rear wall 44, and oppositely disposed side walls 46 and 48. A hinge 50 connects the rear wall 20 of the keyboard 12 to the rear wall 44 of the cover 14, and a spring latch 52 in the front wall 18 of the keyboard is adapted to receive and releasably hold a keeper 54 depending from the cover front wall 42 to keep the two-piece computer case closed when not in use.

Integrated into the keyboard 12 within the keyboard top opening 28 and laterally adjacent the keys 30 is a manually manipulatable member which in the preferred embodiment is a button-like joystick 56. The joystick 56 is permanently mounted for a very slight tilting movement relative to the keyboard in any direction within a complete 360° range, and it is positioned immediately laterally adjacent the last key in the second alphanumeric row of keys 33 and between the last key in the first alphanumeric key row, i.e., the "backspace" key, and the last key in the third alphanumeric key row, i.e., the "enter" key. Thus, the joystick is surrounded on three sides by the keys of the keyboard. The exact positioning of the joystick 56 relative to a particular alphanumeric row is not important, although this particular positioning is advantageous because it does not require any change in the position of the "backspace", "enter", or "shift" keys on the right hand side of the keyboard. The joystick is positioned within the area defined by the keys of the keyboard and at the extreme outside edge of that area, laterally adjacent the last key in one of the rows of keys and between that key and one of the keyboard side walls. Thus, the cursor-moving joystick is as easily reachable by the operator's fingers as any of the keys of the keyboard.

Since the joystick 56 is positioned within the area defined by the keys 30 of the keyboard, it is important that the joystick not interfere with the normal typing operation of the keys by the computer operator. Thus, the top of the joystick 56 should not protrude above the tops of the keys 30. It is preferred that the joystick top be sufficiently small that the operator's finger when in pressing engagement therewith will be able to move the joystick throughout its 360° range of motion, and the top of the joystick is preferably covered with a resilient rubber-like layer to prevent slippage between the operator's finger and the joystick. It is not necessary that the joystick move perceptively in signalling the desired movement of the cursor. Indeed, a pressure sensitive joystick with strain gauge type sensitivity could be employed. However, the advantage of a slightly tilting type joystick is that it can employ well known joystick electronics, the directional control is more certain and the "feel" to the operator seems better.

Extending through the front wall 18 of the keyboard are two depressible click or "mouse" buttons 58 and 60. Depending upon the setting of the computer program, button 58 on the left usually operates in the standard manner of the left click button of a mouse to signal the choice of a computer command identified by the position of the cursor on the computer display screen 16. The click button 60 on the right operates in the same manner as the standard right button on a mouse and may, for example, be used to pull down special menus or cancel a particular aspect of a program, again depending upon the program and the options set by the computer user.

The positioning of the click buttons 58 and 60 is an important aspect of this invention. The mounting of these buttons in the front wall 18 of the keyboard assures that the buttons will be operated by the bottom of the operator's thumb which carries the sense of touch and not the side of the thumb. This is a normal and very comfortable contracting motion of the thumb, which means that the operation of the click buttons will be natural and comfortable even during prolonged periods of operation. The buttons are placed out of the way of the normal keyboard operation so that they will not be accidentally hit during typing or when the hands are at rest. Nevertheless, the buttons are placed for convenient operation by the operator's thumb. The positioning of these buttons just to the right of center in the keyboard front wall enables the computer operator to operate these buttons while enabling the hand to rest on a work surface, which may be a table or knee, thereby assuring comfort and preventing fatigue for the operator even during prolonged periods of pointer operation. The operator thus moves his or her hand to the right from the home (i.e. alpha-numeric key operating) position, a movement which is very similar to that used with most desktop computers/mouse systems.

While many operators may prefer to use their index finger for operating the joystick 56 as shown in FIG. 1, this only involves the moving of the hand to the right. In order to return to the home position on the keyboard keys all the operator needs to do is to move the hand a few inches to the left to bring the fingers back to home position over the keys. The joystick 56 and the buttons 58 and 60 are sufficiently close to each other that they may be easily reached by any operator without stretching.

Figure 5:
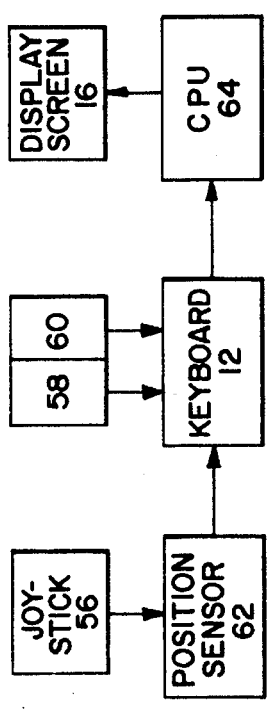
FIG. 5 is a diagram of the manner in which the joystick and click button signals are conventionally processed.

The electronics for operating the joystick 56 and the click buttons 58 and 60 are conventional and are shown diagrammatically in FIG. 5. The direction and angle of tilt of the joystick 56, i.e., the lateral pressure upon the joystick is sensed by a sensor 62 and a signal indicative of this direction and angle or pressure is transmitted through the keyboard 12 to the computer (CPU) 64 where it is processed in the well known manner, and this processed signal is then sent to the display screen 16 where it causes the cursor to move across the display screen in a direction and to a position corresponding to the direction and angle of the joystick in the conventional manner. The important aspect of this invention is the ergonomic positioning of the cursor-positioning joystick 56 and the click buttons which enable a computer user to position the cursor and execute mouse commands in a completely natural and normal way with the movement from home position being similar to the movement with which computer users are familiar when using most desktop computer/mouse systems. Moreover the movement away from the home position is very slight, enabling the operator to quickly and easily return to home position for operation of the alpha-numeric keys.

The foregoing detailed description has been given only by way of example, and various modifications may be made to the embodiment described and illustrated without varying from the invention as hereinafter claimed.

What is claimed is:

1. In combination with a standard portable computer keyboard having a substantial vertical front wall, a rear wall, a pair of oppositely disposed side walls, and a substantial horizontal top, said top having an opening, and a plurality of depressible keys arranged in rows and extending upwardly through said top opening; a pointing device having a manually manipulatable button-like joystick for positioning a cursor on a computer display screen in accordance with the direction and magnitude of manual force applied to said joystick, said joystick being integrated into the keyboard and located within said computer keyboard top opening between a last key in one of said row of keys and one of said keyboard side walls and being surrounded on three sides by said depressible keys and having its upper end approximately level with the top of the keys, at least one depressible click button for signaling the choice of a computer command identified by the position of the cursor on the computer display screen, said click button extending substantial horizontally through the front wall of said computer keyboard and being easily reachable with the thumb of one hand while a finger of that hand is in operable contact with said joystick.

2. In combination with a standard portable computer having a two-piece closable case including a top cover portion housing a display screen, and a bottom portion hinged to said top cover portion and comprising a keyboard having a substantial vertical front wall, a rear wall, a pair of oppositely disposed side walls, a substantial horizontal top having an opening, a bottom wall adapted to rest upon a supporting surface and a plurality of depressible keys arranged in rows and extending upwardly through said top opening; a pointing device having a manually manipulatable member for moving and positioning a cursor on said computer display screen, said manually manipulatable member being integrated into the keyboard and fixedly positioned in said bottom portion laterally adjacent the keys of the keyboard in between a last key in one of said rows of keys and one of said keyboard side walls, whereby said top cover may be closed over the bottom portion including the manually manipulatable member, and at least one depressible click button for signaling the choice of a computer command identified by the position of the cursor on the computer display screen, said click button extending substantial horizontally through the substantial vertical front wall of said computer keyboard immediately adjacent said keyboard bottom wall and being easily reachable with the thumb of one hand while a finger of that hand is in position for operating the manipulatable member and the hand may rest on the surface supporting said keyboard substantially normal to the manipulatable member bottom wall adjacent the computer during operation of the pointing device.

3. In combination with a standard portable computer having a two-piece closable case including a top cover portion housing a display screen and a bottom portion comprising a keyboard adapted to rest upon a supporting surface and having a substantial vertical front wall, a rear wall, a pair of oppositely disposed side walls, and a substantial vertical top having an opening, and a plurality of depressible keys arranged in rows and extending substantial vertically upwardly through said top opening; a pointing device having a manually manipulatable member for governing the position of a cursor on the computer display screen in accordance with the direction and magnitude of manual force applied to said member, said member extending substantial vertically upwardly and being integrated into the keyboard and located within said computer keyboard top opening immediately adjacent a last key in one of said rows of keys and between that last key and one of said keyboard side walls and being surrounded on at least two sides by the keys of the keyboard and the upper end of said member being approximately level with the top of said key, and at least one depressible click button for signaling the choice of a computer command identified by the position of the cursor on the computer display screen, said click button extending substantial horizontally through the front wall of said keyboard and being easily reachable with the thumb of one hand while a finger of that hand is in position for operating the manipulatable member and the hand may rest on the surface supporting the keyboard adjacent the computer during operation of the pointing device.

4. The structure of claim 3 wherein said pointing device manually manipulatable member is forcibly tiltable to govern the direction and magnitude of the cursor movement.

5. The structure of claim 3 wherein said pointing device is a short manually tiltable joystick, with the direction and speed of movement of the cursor across the computer display screen corresponding to the direction and force of the lateral pressure applied to the joystick.

\* \* \* \* \*